Oct. 10, 1933.     J. F. FRANZEN     1,930,007
SELF CLOSING GAS COCK
Filed Oct. 20, 1930
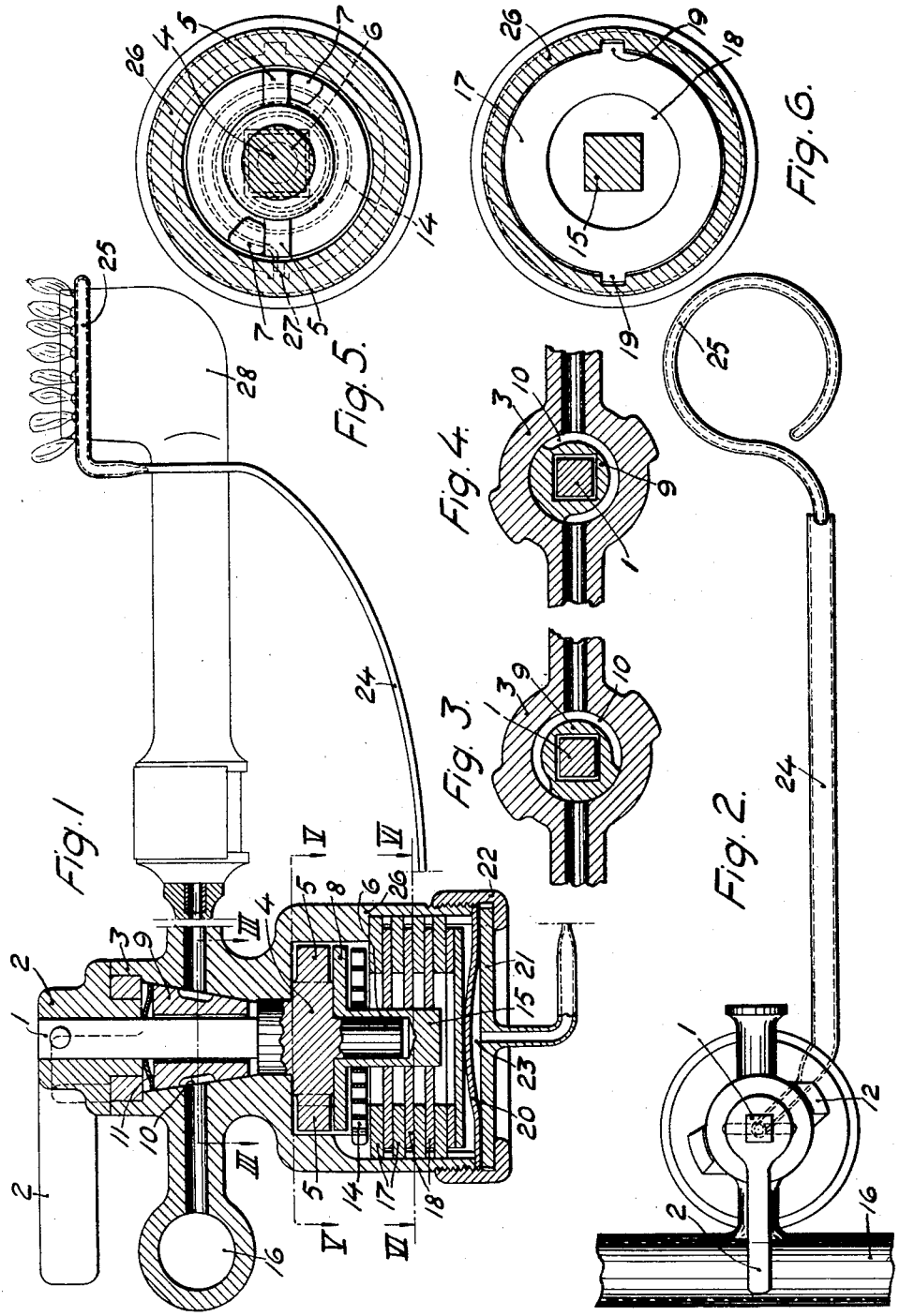
Inventor
J. F. FRANZEN
by Emil Bonnelycke
Attorney Patented Oct. 10, 1933

1,930,007

UNITED STATES PATENT OFFICE 1,930,007

SELF-CLOSING GAS COCK

Johan Fritiof Franzén, Tranas, Sweden

Application October 20, 1930, Serial No. 490,045, and in Sweden July 16, 1927

6 Claims. (Cl. 158—117.1)

The present invention relates to a valve for gas ranges and the like, said valve provided with a self-acting shutting device and stopping device for the latter in combination with a thermostat consisting of a tubular body which communicates with a pressure chamber having an elastic, yielding wall (piston, membrane or the like), and which contains some medium which expands on being heated, and which is intended to be disposed in such a way that it is subjected to heat radiation from the burner.

The appended drawing shows an embodiment of the invention in question.

Figure 1 shows a view of a burner with the valve partly in section;

Fig. 2 is a plan view of the valve;

Figs. 3 and 4 are sectional views taken on line III—III in Fig. 1, viewed in the direction of the arrows;

Fig. 5 shows a sectional view taken on line V—V in Fig. 1; and

Fig. 6 shows a cross sectional view taken on line VI—VI in Fig. 1.

The valve is here shown as being of the rotary plug type. It consists of the shaft 1, the head 2, the valve body 9 and the seat or casing 3 in which the shaft 1 is rotatably mounted by suitable bushings. The valve body is slidable on the shaft 1, but is positively turnable with the same, and is held against its seat by means of a spring plate 11. This arrangement is intended to prevent binding of the valve body in the casing by an axial load when the valve body is opened or shut. On the shaft 1 is fixed a hub 4 having arms 5 and a central projection 6 (Figs. 1 and 5) and on the latter is fitted a catch disk 8 having a central bearing 15 in which the projection 6 is turnable. Round the bearing 15 lies a spiral spring 14, the inner end of which is fastened to the said bearing, and the outer end of which is fastened in a groove 27 of a box 26 (Figs. 1 and 5) connected with the valve casing 3 in such a way that the spring by means of the disk 8, projections 7 on said disk, and the arms 5 is capable of turning the valve body 9 to a closed position.

For purposes of description, the spring and its associated elements may be termed the means for urging the valve to a closed position or the closing means.

In order that the spring shall not shut the valve while the gas is burning, the following arrangement is made: Around the bearing 15, which has a square external cross-section, are laid friction disks 17, 18. These disks are preferably of different material, such as iron and brass, alternating with each other, the former of which, 17, are provided with projections 19 positioned in grooves (Fig. 6) of the box wall 26 in such a way that they will not rotate. Disks 18, which are provided with central square openings, are mounted on the square bearing 15 and are rotated therewith. All the disks are movable axially of the bearing 15 so that they may be pressed together in order to increase the friction between those rotatable with the bearing 15 and those fixed to the wall 26.

Below these disks a yielding wall, for instance a membrane 20, is fixed by means of a screw-sleeve 22 and a packing disk 21 in such a way that the membrane presses the friction disks 17, 18 against each other when said membrane is actuated by the pressure in chamber 23. The membrane may be manufactured for instance from rubber or thin sheet metal. The pressure chamber 23 between the membrane 20 and the disk 21 communicates through the narrow tube 24 with the pipe coil 25 which is bent around the burner in such a way that it will be located close to the gas flame. The pipe coil is thin-walled, closed in the end and arranged in such a way that it can expand on being heated, and contains a heat-constant medium, such as air. The total volume of the pressure chamber 23 and the tube 24 should be small relative to the volume of the pipe coil in order that the pressure variations shall be great at changes in the temperature of the enclosed medium.

The apparatus operates in the following manner: When the valve is closed the head 2 always rests against the shoulder 12. When opening the valve the head is turned to the position shown in Figs. 1 and 2, whereby the shaft 1, by means of the arms 5 and the projections 7, turns the catch-disk, and the bearing 15 turns the friction-disks 18. During this operation the spring 14 is being stretched. The valve body 9 now takes up the position shown in Fig. 4, and gas can now flow from the inlet 16, through the channel 10 of the plug to the burner 28. When the gas has been lit, the pipe coil 25 is heated, and the air enclosed in the coil expands and exerts a pressure on the membrane 20, the friction disks 17 and 18 are positively engaged, the catch-disk 8 is held against rotary action of the spring and the valve body now remains in the position in which it has been set. The body 9 may, however, even if the catch disk is stopped in the above-mentioned manner, be turned to the left until the arms 5 strike against the projections 7 on their opposite side. Thus the valve body 9 may be set in a desired position, and the gas inlet, consequently, be throttled or shut without the catch-disk 8 being turned. If then the gas flame on account of any reason goes out without the valve having been shut, for instance thereby that a pot boils over, the pipe coil 25 cools and the pressure in the same and in the chamber 23 is reduced. The catch-disk 8 then turns the shaft 1 to the left until the head 2 strikes against the shoulder 12, i. e. the valve is shut, see Fig. 3. Should the valve, for some reason, be opened unintentionally the spring will immediately turn it back to the closed position. Instead of the spring a counterweight or a magnet arranged in a suitable way may be used.

The shaft 1 need not run through the valve body 9, but may be carried out with a coupling between the shaft and one end of the valve body as well as with a coupling between the head of the valve and the other end of the valve body. Thus the passage 10 may run diametrically through the valve body instead of along the mantle surface of the valve body as in Fig. 1. Of course the apparatus may be simplified in such a way that the valve body is mounted on the shaft or is made in one piece with said shaft, in which case the passage 10 also may run diametrically through the body. Also the stopping device for the catch-disk 8 may be of some other form, for instance as a clutch-coupling. In this instance two disks provided with teeth are substituted for the friction disk, one of which is fixed to the square bearing 15 and the other to the valve casing, but is movable in an axial direction so that the teeth of the disks engage each other when the membrane exerts a force on the latter disk, but are disengaged when the pressure of the membrane ceases.

Another embodiment of the apparatus is to let the membrane press directly or indirectly on the valve body which is permanently urged to a closed position by a spring or other means. The valve body is in this embodiment made with such conicity and is turned in such a way that, when the membrane is pressed, the plug is wedged or bound in its position, and the plug is disengaged and turns to the shutting position when the pressure of the membrane ceases.

I may also use a shutting valve according to this invention and a valve quite separate from the former for the very control of the gas.

An important advantage of the valve according to my invention lies therein that it can be supplied separately and be applied to gas ranges and the like, also after installation of the same.

Having now described my invention, what I claim as new and desire to secure by Letters Patent is:

1. A safety cut-off valve for gas burners comprising a valve casing, a valve body rotatable therein, means for constantly urging the valve body to a closed position, a clutch operatively associated with the urging means, said clutch comprising axially movable plates fixed to the valve casing against rotation, plates movable with the urging means, and thermostatic means responsive to heat from the burner for effecting an engaging connection between said plates to render the urging means inoperative for closing the valve when heat is being generated in the burner.

2. A safety cut-off valve for gas burners comprising a valve casing, a valve body rotatable therein, means for constantly urging the valve body to a closed position, a lost-motion device connecting the urging means to the valve body, a clutch operatively associated with the urging means, said clutch comprising a plurality of axially movable plates fixed to the valve casing against rotation, plates movable with the urging means, and thermostatic means responsive to heat from the burner for effecting an engaging connection between said plates to render the urging means inoperative for closing the valve when heat is being generated in the burner.

3. A safety valve for gas burners comprising a valve casing, a valve body rotatable therein, closing means rotatable coaxially with the valve body for normally rotating the valve body to a closed position, a plurality of clutch plates rotatable with an axially movable relative to the closing means, a plurality of non-rotatable axially movable clutch plates interrelated with those rotatable with the closing means, and thermostatically controlled means for moving the clutch plates axially into engagement with each other for retaining the closing means in adjusted positions.

4. A safety valve for gas burners comprising a valve casing, a valve body rotatable therein, closing means rotatable coaxially with the valve body for normally rotating the valve body to a closed position, a lost-motion connection between the valve body and the closing means, a plurality of clutch plates rotatable with and axially movable relative to the closing means, a plurality of non-rotatable axially movable clutch plates interrelated with those rotatable with the closing means, and thermostatically controlled means for moving the clutch plates axially into engagement with each other for retaining the closing means in adjusted positions, said lost motion device being so constructed that the valve body may be moved independently of the closing means between its closed and the adjusted position of the closing means when the closing means is retained in adjusted positions.

5. A safety cut-off valve for gas burners comprising a valve casing, a valve body rotatably seated therein, a valve stem extending through the valve body for rotating the valve body, closing means mounted on the lower end of the stem for rotating the valve stem to a closed position, a plurality of clutch plates rotatable with and axially movable relative to the closing means, a plurality of non-rotatable axially movable clutch plates interrelated with those rotatable with the closing means, and thermostatically controlled means for moving the clutch plates axially into engagement with each other for retaining the closing means in adjusted positions.

6. A safety cut-off valve for gas burners comprising a valve casing, a valve body rotatably seated therein, a valve stem extending through the valve body for rotating the valve body, closing means freely rotatively mounted on the lower end of the stem for rotating the valve stem to a closed position, a lost-motion connection between the stem and the closing means, a plurality of clutch plates rotatable with and axially movable relative to the closing means, a plurality of non-rotatable axially movable clutch plates interrelated with those rotatable with the closing means, and thermostatically controlled means for moving the clutch plates axially into engagement with each other for retaining the closing means in adjusted positions.

JOHAN FRITIOF FRANZÉN.